(12) United States Patent
Merz

(10) Patent No.: US 10,190,642 B2
(45) Date of Patent: Jan. 29, 2019

(54) TOOTHING FOR OPERATION AT A DEFLECTION ANGLE AND PRODUCTION METHOD

(71) Applicant: SMS Siemag AG, Duesseldorf (DE)

(72) Inventor: Juergen Merz, Kreuztal (DE)

(73) Assignee: SMS SIEMAG AG, Duesseldorf (DE)

( * ) Notice: Subject to any disclaimer, the term of this patent is extended or adjusted under 35 U.S.C. 154(b) by 546 days.

(21) Appl. No.: 14/748,374

(22) Filed: Jun. 24, 2015

(65) Prior Publication Data

US 2015/0292564 A1 Oct. 15, 2015

Related U.S. Application Data

(63) Continuation-in-part of application No. 14/128,892, filed as application No. PCT/EP2012/062160 on Jun. 22, 2012, now abandoned.

(30) Foreign Application Priority Data

Jun. 24, 2011 (DE) .......... 10 2011 078 071
Jul. 29, 2011 (DE) .......... 10 2011 080 130

(51) Int. Cl.
  *B21B 35/14* (2006.01)
  *F16D 3/18* (2006.01)
  *F16D 11/00* (2006.01)

(52) U.S. Cl.
  CPC ............ *F16D 3/185* (2013.01); *B21B 35/143* (2013.01); *F16D 2011/008* (2013.01)

(58) Field of Classification Search
  CPC .......... B21B 35/143; B23P 15/00; F16D 1/02; F16D 3/185
  See application file for complete search history.

(56) References Cited

U.S. PATENT DOCUMENTS

| | | | | |
|---|---|---|---|---|
| 4,704,096 A | * | 11/1987 | Marek | ...................... F04C 2/104 418/61.3 |
| 4,913,681 A | * | 4/1990 | Green | ...................... F16D 3/10 464/154 |
| 5,174,699 A | | 12/1992 | Faulstich | |
| 6,026,700 A | | 2/2000 | Mancuso | |

FOREIGN PATENT DOCUMENTS

GB         1034305        6/1966

* cited by examiner

*Primary Examiner* — Matthieu F Setliff
(74) *Attorney, Agent, or Firm* — Abelman, Frayne & Schwab

(57) ABSTRACT

A toothing, in particular of a drive spindle for driving a roll in rolling mills or continuous casting plants, which has several teeth and meshes with a second toothing in the manner of a spline, wherein a flank line of the teeth has a curvature, and a deflection angle is formed between the rotational axis of the second toothing and the rotational axis of the drive spindle toothing, and wherein the teeth of drive spindle toothing have a twist in form of profile angle deviation over the tooth width in the flank direction.

15 Claims, 6 Drawing Sheets

FIG. 6
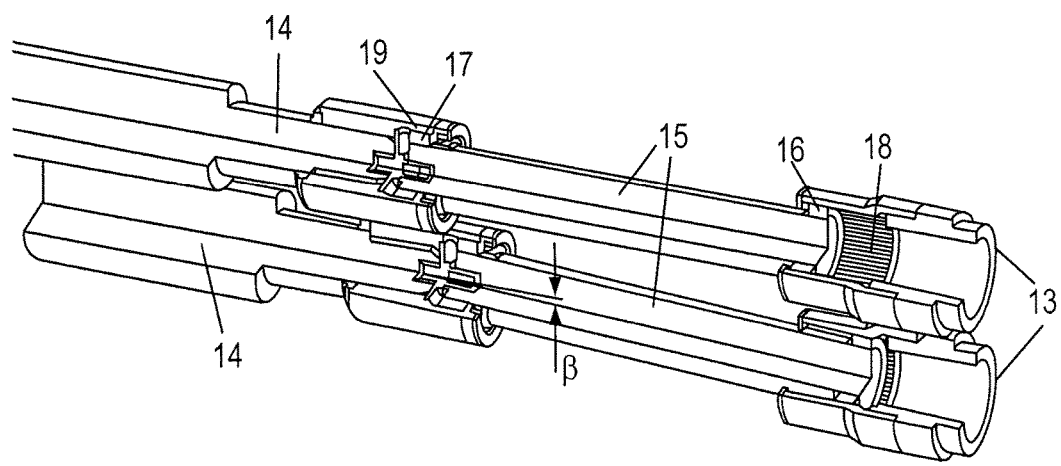
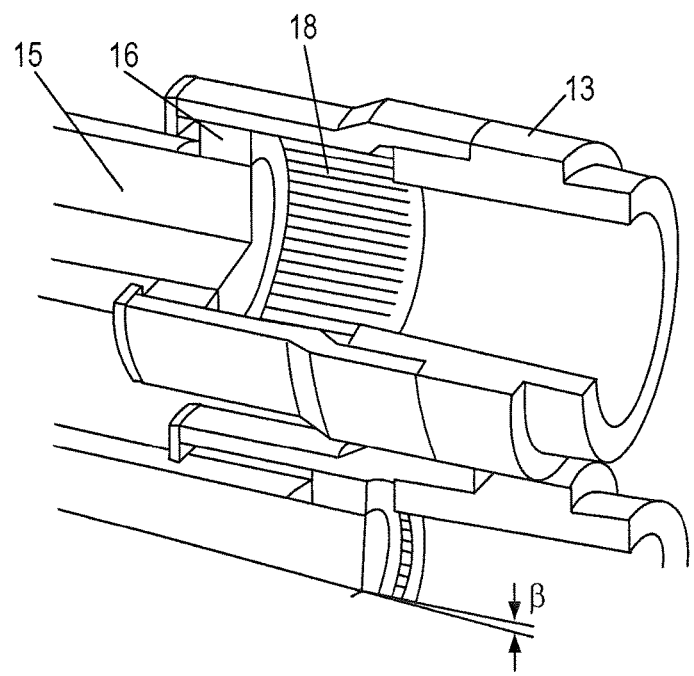
FIG. 7

TOOTHING FOR OPERATION AT A DEFLECTION ANGLE AND PRODUCTION METHOD

RELATED APPLICATIONS

This is a continuation-in-part application of U.S. application Ser. No. 14/128,892 filed Mar. 12, 2014 (now abandoned) which is a National Stage Application of International Application PCT/EP2012/062160 filed Jun. 22, 2012 and claiming priority of German applications DE 10 2011 078 071.8 filed Jun. 24, 2011 and DE 10 2011 080 130.8 filed Jul. 29, 2011.

BACKGROUND OF THE INVENTION

1. Field of the Invention

The present invention relates to the field of toothings and, in particular, to a spline toothing having a first toothing engaging in a second toothing of a drive spindle for driving, e.g., a roll in a rolling mill or a continuous casting installation. The invention also relates to a device including such toothing.

2. Description of the Prior Art

In known applications, force transmission from a drive to a shaft at an angle is required. This requirement often arises, e.g., in rolling mills. E.g., if two working rolls are arranged one above the other, then, because of their relative small diameters, a problem arises when an increase of the transmitted torque is desired. If the transmitted torque increases, the working roll diameters need also be increased which, among others, leads to the energy losses. In addition, in this case, the rolling mill stand should be formed more robustly.

Therefore, the existing systems include universal joints arranged between the drive spindle and the roll, however, the requirements of an increased torque transmission are still not justifyingly met.

If splines are used for arranging the drive spindle at an angle to the roll, the drive spindle can be formed so that it is able to transmit a greater rolling mill torque, nevertheless, classical toothings, which are conventionally used in drive spindles, lead to edge loading which causes a very high wear and, as a result of which, no transmission of a desired high torque is possible.

The object of the invention is to be able to provide, between a toothing and a complementary second toothing, a deflection angle with which a greater torque can be transmitted than was the case up to now.

SUMMARY OF THE INVENTION

According to the invention, this object is achieved for the above-mentioned toothing by forming the teeth with a twist in form of a profile angle deviation over a tooth width in direction of the flank.

With this profile modification, the first toothing can be driven at a deflection angle relative to the second toothing and can transmit a greater torque than was the case without the modification. In particular, the undertaken modification reduces the edge loading and provides for the increased torque transmission. Advantageously, two or more modifications can be combined, e.g., relief of the tooth root and/or the tooth tip can be combined with the tooth twist to further improve the characteristics of the toothing.

Within the meaning of the invention, the relief of the tooth root and/or the tooth tip and the tooth twist means that the profile line falls back in comparison with the conventional profile and, in particular, in the contact region of the teeth flanks during normal operation.

Further, the invention permits to increase the torque transmitted from a drive spindle to a roll and/or to increase the deflection angle between the drive spindle and the roll. Without the above-discussed modification, the carrying section of the flank becomes smaller at an increased deflection angle that is greater than zero, so that with the increased deflection angle, less torque can be transmitted. With the inventive toothing, the load can be uniformly distributed over the tooth height. Thus, e.g., the drive spindle can transmit, in certain cases, a torque increased by 50%, whereby greater strip widths can be rolled. With a further increase of the transmittable torque, the working rolls even can be made smaller.

According to an advantageous embodiment of the toothing, the toothing is formed as an involute toothing, whereby the tooth roots and/or tooth tips can be advantageously, but not necessarily, relieved at least parabolically. The relief can be produced at the generating line and/or at the tooth profile. The at least parabolic relief should be understood as a relief with which the profile difference between the theoretical flank of an involute toothing and the inventive relieved flank is a function of an increase of a roll-off path over the profile of the involute toothing at least with about second power. That is why the relief is advantageously substantially parabolic.

With the parabolic relief of the tooth root or tip, the edge loads can be reduced and, thereby, the torque transmission can be improved.

In a further advantageous embodiment of the toothing, the tooth roots are relieved at a root circle by from 0.2% to 3% of a tooth thickness at a pitch circle, and/or the tooth tips are relieved at a tip circle by 0.1% to 2% of the tooth thickness at the pitch circle.

With these values of the profile modification of each tooth, the force transmission can be optimized during engagement of the toothings.

According to a further advantageous embodiment of the toothing, the tooth tip relief is provided between 50% and 70% of the tooth height and/or the tooth root relief is provided between 50% and 60% of the tooth height.

The above-mentioned values for the relief of the tip or root with respect to the tooth height permit to further optimize the transmittable torque.

In a still further advantageous embodiment of the toothing, an involute line of the teeth is symmetrically curved in a width direction. Under the involute line, as known, the bottom between two adjacent teeth is understood.

By forming a curved involute line, the torque transmission can be further increased. According to a yet further advantageous embodiment of the toothing, a curvature of the flank line is so formed that difference between a greatest thickness of each tooth at a height of the pitch circle and a smallest thickness of each tooth at the height of the pitch circle corresponds to a value between 3% and 20% of the greatest thickness of each tooth at the height of the pitch circle.

This feature makes advantageous profile of the curvature of the flank line more precise.

According to a further advantageous embodiment of the toothing, the twist of the teeth is formed by a maximal profile angle deviation between 0.3° and 1.5°.

This is a relatively small value of the twist noticeably improves the torque transmission during engagement of the toothing in the second toothing at an angle.

In another advantageous embodiment of the toothing, the twist of the teeth is formed substantially parabolic in direction of the tooth flank. This means that the profile deviation, as a function over the tooth width, has essentially a parabola-shaped profile.

The basic shape of the toothing is produced as a result of reduction of the basic shape, e.g., by milling and the like. The subsequent treatment for obtaining the inventive toothing can follow by grinding in a free-movable machine-tool, e.g., a 4-axes and 5-axes machine-tool.

Advantageously, a curved-back toothing is obtained, after production by a classical method as involute toothing, by the parabolic relief of the tooth root and/or the tooth tip by subsequent treatment.

The after treatment is carried out by at least one of grinding process or by grinding each tooth flank.

The invention further includes a device for driving a roll of a metallurgical installation and including a shaft with a toothing according to present invention. Such a shaft can, e.g., be set in a corresponding opening in a roll and/or a motor in a manner of a spline toothing. The opening can be provided, in particular, with an inner toothing that can likewise be formed according to the invention. The inner toothing can be formed, in a possible embodiment, in which the shaft or the inventive toothing is displaceable by a predetermined stroke, as a spur toothing.

In an advantageous embodiment of the device, the inventive toothing is provided at both ends of the shaft. This provides an intermediate shaft that, e.g., is connectable at both end by an inclined spur toothing, and, thus, enables transmission of a particular large torque at a particular large angle or a predetermined angle.

In an advantageous embodiment, the shaft and the roll are arranged relative to each other at a deflection angle of more than 0°, in particular more than 0.2°. Particularly advantageously, the deflection angle does not exceed 3°, in particular, lies between 2° and about 3°.

BRIEF DESCRIPTION OF THE DRAWINGS

Below, the drawings of the embodiments of the invention will be briefly described. Further details will become apparent from the detailed description of the embodiments.

The drawings show:

FIG. 6 a partial elevational view of the inventive device for driving rolls of a metallurgical installation; and FIG. 7 a view of a detail of the device of FIG. 6 at an increased scale.

DETAILED DESCRIPTION OF THE PREFERRED EMBODIMENTS

It is to be noted that one of ordinary skill in the art is familiar with terms such as pitch circle, tip circle, root circle, surface line, flank line, pressure angle, twist and others and, therefore, they will be used in the following description without any further explanation. Below, a brief explanation of less common definitions of the profile angle deviation and twist are provided. Profile angle deviation is defined as a deviation of the standard profile angle. The profile angle is the angle between a cutting edge or a cutting surface and a principal direction. The profile angle deviation is normally intended to be constant, any deviation is traditionally considered as manufacturing fault. The twist however is an intended, specially machined profile angle deviation following a certain mathematical rule.

Figure 1:
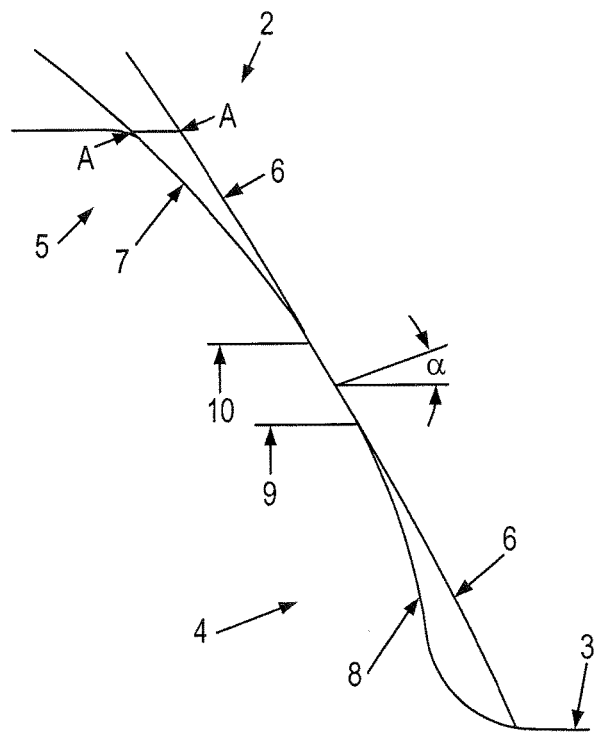
FIG. 1 a partial cross-section over the height of a tooth of an embodiment of the invention in which modification of a profile of the right flank of the tooth is shown, in particular of the tooth root and of the tooth tip.

FIG. 1 schematically shows a cross-section of a flank of a tooth 2 of a toothing 1. The flank line is convexly bent, and therefore, basically, one can speak of a curved-back toothing. On the right of this flank, a tooth gap 3 is seen. The rotational axis of the toothing 1 extends perpendicular to the shown cross-sectional plane. The pressure angle $\alpha$ of the toothing can have different values, in particular, it can advantageously amount to values between 26° and 34°. The line 6 represents the profile line of the tooth 2 in form of a classical involute line 6 of a known involute toothing. Though, according to the invention, the root 4 and/or the tip 5 can assume, preferably, other forms ground with respect to a classical involute form. The relief of the tooth tip 5 is shown with line 7, and of the tooth root 4 with line 8. The relief of the tooth tip 5 at the tip circle is schematically shown by a path or spacing A-A. The radii or diameters, with which the relieves of the tooth root 4 and or of the tooth tip 5 are set, are shown with reference numerals 9, 10. Between the points 9 and 10, the profile of the flank of the tooth 2 corresponds, preferably, to an involute shape 6, however, it can be described by other conventional profiles. The tooth tip relief and the tooth root relief, which are shown in FIG. 1, are shown at a substantially increased scale, and they should be understood as only schematic. The same applies to radii 9 and 10. The tooth root relief can have different values, however, they amount, preferably, at the tooth circle, between 0.2% and 3% of the tooth thickness measured at the pitch circle, wherein the thickness direction extends transverse to the width direction of the toothing 1. The tooth tip 5 preferably has a relief from about 0.1% to 2%, at the tip circle or at the height of the tip circle, of the tooth thickness (measured at the pitch circle). The relief of the tooth tip 5 starts, preferably, between 50% and 70% of the tooth height, and/or of the tooth root 4 between 50% and 60% of the tooth height. The tooth height is defined as difference of radii of the tooth tip and the tooth root. In other words, it means that the tip and/or root relieves are set at radii which correspond to the above-mentioned percentage parameters of the difference between the tip and root circles radii.

Figure 1A:
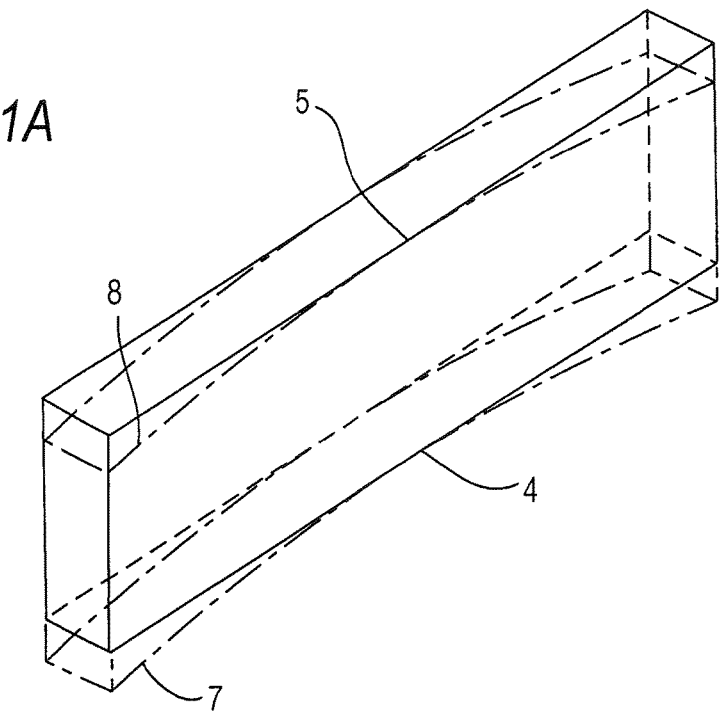
FIG. 1a a schematic perspective view of the tooth showing modification, of the tooth generating line.
Figure 1B:
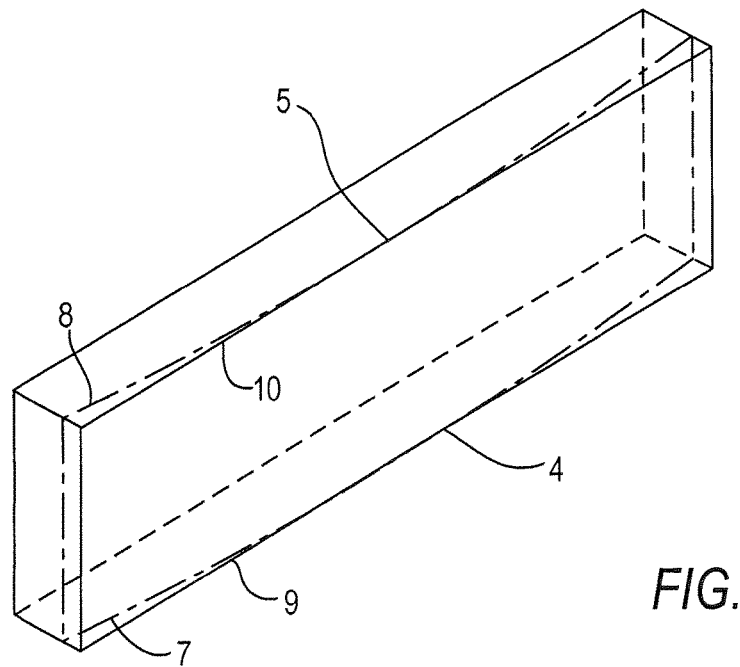
FIG. 1b a schematic perspective view showing modification of the tooth profile.

FIG. 1a shows a schematic perspective view of the tooth similar to the tooth shown in FIG. 1 and showing modification of the tooth generating line with the tip relief 7 and the root relief 8. FIG. 1b shows, correspondingly modification of the tooth profile with the tip relief 7 and the root relief 8. To show more precisely the effect on the outer contour of a tooth the originally rectangular contour (solid lines) is superimposed by the modified contour (with dash lines).

Figure 2:
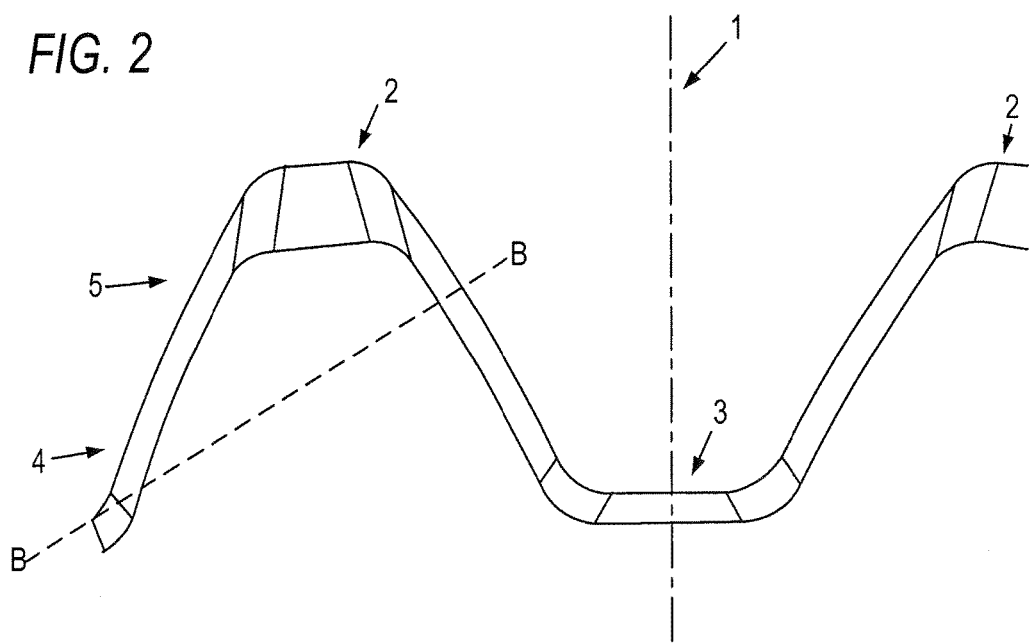
FIG. 2 a schematic plan view of an embodiment with a cross-sectional plane B-B.

FIG. 2 likewise shows a schematic cross-section of an inventive toothing 1, however, here, only the curvature or the modification of the involute line is emphasized. The view should be understood as two-dimensional. Only tooth 2 of the toothing 1 and a tooth gap 3 between the teeth are seen. The line at the upper end of the left tooth 2 represents the highest position in the width direction (direction of the rotational axis of the toothing or, in the future in Z-direction) of the involute line. The lower limiting line of the left tooth 2 represents the involute line at the edge of the toothing 1, as seen in the width direction. The curvature of the involute line is advantageously obtained by grinding a classically formed or produced toothing. However, other known manufacturing processes can be used. The curvature, preferably seen in the width direction, is mirror-symmetrical towards the middle of the toothing 1 and is curved particularly outwardly or is convex.

Figure 3:
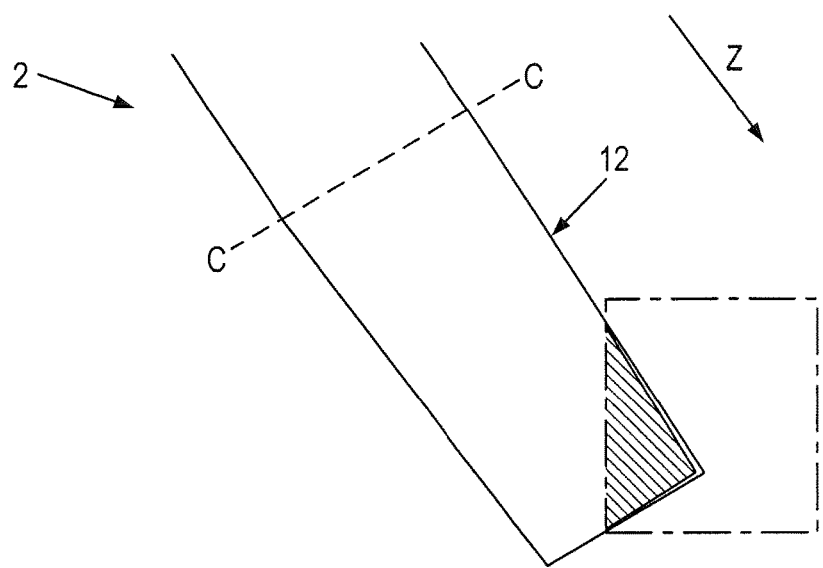
FIG. 3 a plan view of the cross-section B-B in FIG. 2.

The line B-B in FIG. 2 defines a cross-sectional plane which is shown and clarified in FIG. 3. The cross-sectional plane B-B passes through the intersection of the pitch circle of the toothing 1 with the involute 6 of a tooth 2.

FIG. 3 shows a plan view of the flank line 12 of the right flank of the tooth 2. The line C-C shows half of the middle axis of the tooth 2 and that extends transverse to the width direction Z, i.e., in the thickness direction of the tooth 2. On the right side of FIG. 3, a rectangle is shown which represents a cut-out shown in FIG. 4.

Figure 4:
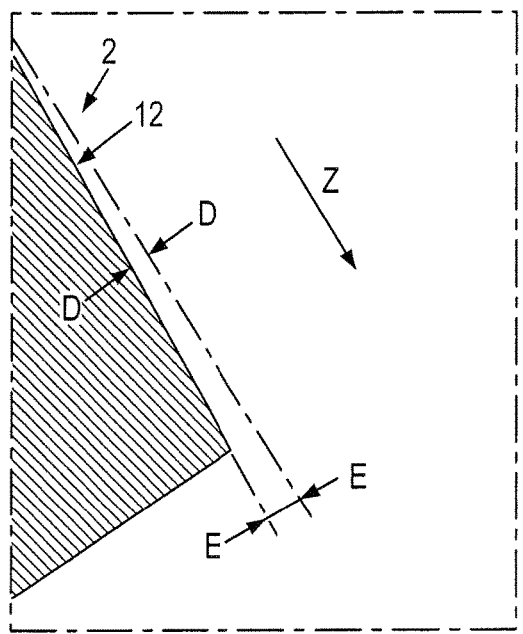
FIG. 4 a view of a detail in FIG. 3 with a schematic representation of a modification of the flank line.

FIG. 4 shows an end of the flank line 12 as seen in the width direction Z. The line D-D shows the relief of the flank line 12 at a first location. The flank line 12 is in particular, curved outwardly or is convex. The relief of the flank line 12 can be obtained preferably by grinding, however, other known processes can be used.

The flank line modification or the relief of the flank line 12 at the rim of the toothing 1 has a size of the line E-E, when seen in the width direction. The size in the drawing should be understood as purely schematic. The relief of the flank line at the rim of the toothing 1 in the width direction can advantageously amount to form 3% to 20% of the thickness of a tooth 2 of a spur toothing or from 3% to 20% of the thickness at the point of the maximum thickness of the tooth 2 at the height of the pitch circle.

Generally, the relief of the flank line in FIG. 4 is seen, in the width direction, at the rim of the toothing 1 but more pronounced that shown by the line E-E. Further, the shown relief, in this case, on the spur tooth 2, is produced by an optional twist, i.e., by a twist.

Such twisting of the tooth can be described by changing the profile angle in the Z-direction or the flank direction of the tooth 2. An example of such profile angle change or twisting is shown in diagram of FIG. 5 and in FIGS. 5a and 5b.

Figure 5:
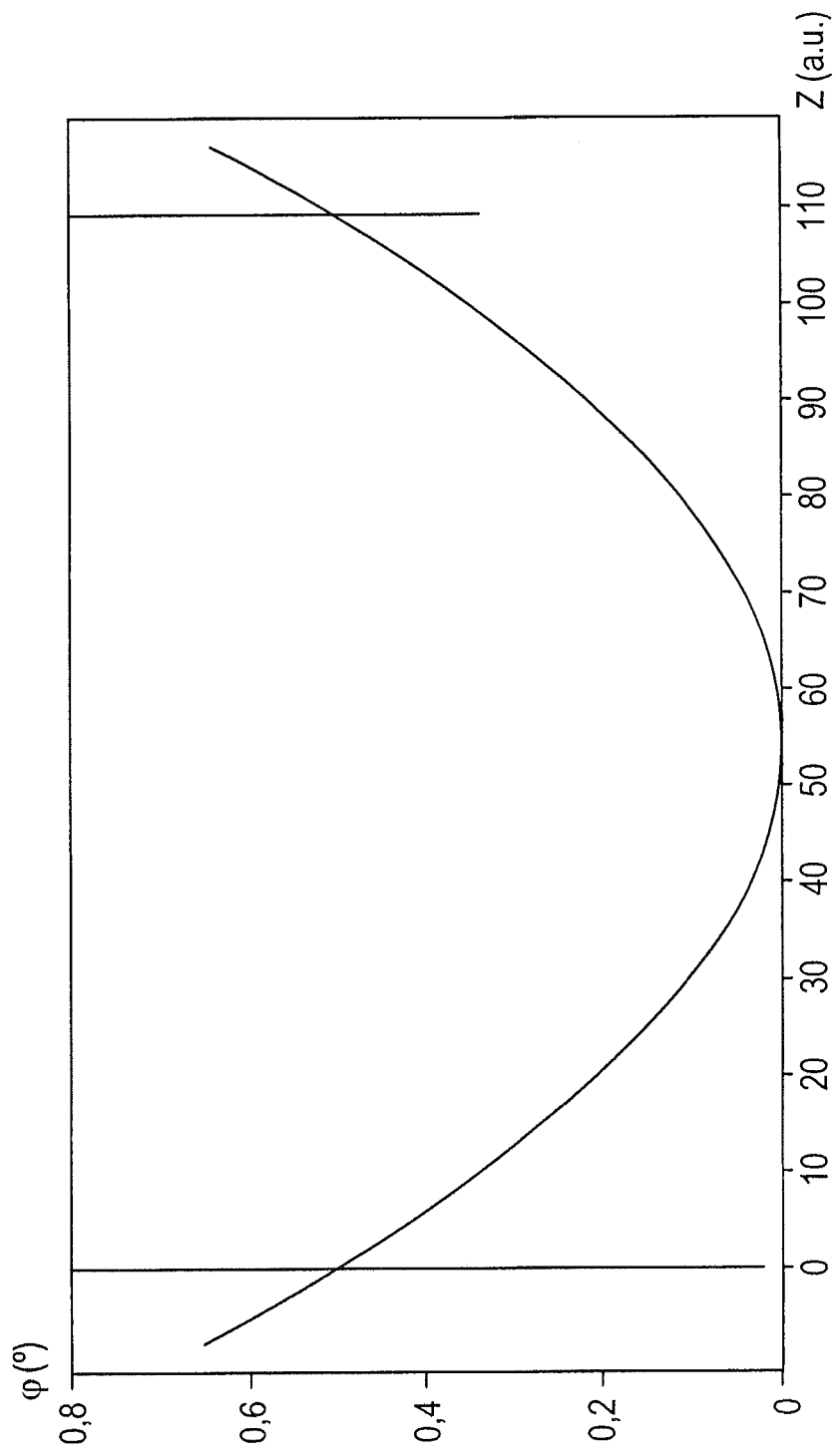
FIG. 5 a schematic diagram of an embodiment of the invention in case of a twist with changing profile of angle in angular units in the Z-direction, at arbitrary heights, extending in a width direction of the tooth.

FIG. 5 shows a parabolic profile of the twist in Z-direction. The profile angle deviation ($\varphi$) is shown in degrees with respect to the width of the toothing 1 in the Z-direction. The numbers in the Z-axis are given only as examples for a width of the toothing 1 from $\varphi$ up to 110, wherein the line unit represents an arbitrary length value. It can be seen that the profile angle deviation in the middle of the toothing 1 in the width direction equals almost zero and falls out at most at rims of the toothing 1. In this example, about 0.5° at the rim. However, other values of twists are possible such as, e.g., twists with a maximum deviation of the profile angle $\varphi$ between 0.3° and 1.5°.

Figure 5A:
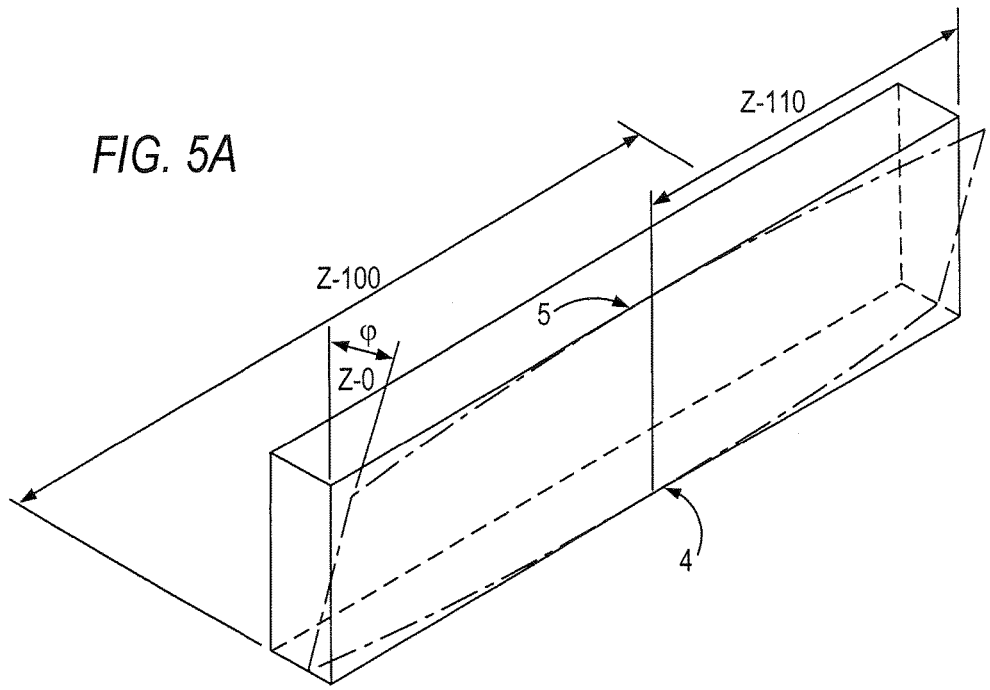
FIG. 5a a schematic perspective view illustrating a profile angle deviation (twist) of a tooth according to diagram of FIG. 5.

FIG. 5a shows the profile angle deviation ($\varphi$) over the tooth width Z (in Z-direction, e.g., 110). As can be seen in FIGS. 5 and 5a, the profile angle deviation in the middle of the tooth width is O, i.e., the twist angle $\varphi$=O.

To show more precisely the outer contour of the tooth shown in FIG. 5a, the originally rectangular contour (solid lines) is superimposed by the contour showing the twist (dash lines).

Figure 5B:
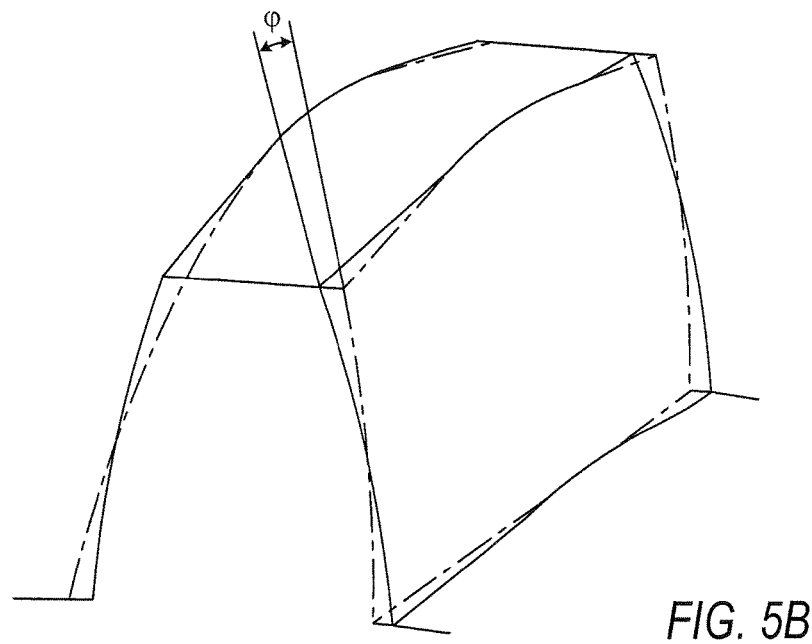
FIG. 5b a schematic view illustrating superimposition of the flank curvature modification and the flank twist modification.

According to the invention, to flank curvature modification resulting from the tip and root relieves can be combined with the twist modification as shown in FIG. 5b. In this case the best results are achieved.

FIG. 5b shows a comparison of the tooth contour according to the invention with twist and additional tip and root relieves (dash-point line) in comparison to a contour with only tip and root relieves (full line). The comparison is in an exaggerated manner to point out the effect of the twist towards the contour of the tooth.

In summary, the above-mentioned profile angle values are valid for a deflection angle $\beta$ (see FIGS. 6 and 7) between the first toothing and a second toothing, preferably, an inner toothing, between 0° and 5° and particularly advantageous between 2° and 5°.

The second toothing can have its rotational axis lying directly on the axis of a roll. In addition, the second toothing can be directly integrated in the roll or lie in an attachment directly connected or connectable with the roll journal, wherein its rotational axis preferably coincides with that of a roll. As generally conventional, such an attachment connects the roll with the drive spindle.

The toothing 1 described with reference to different embodiments, is preferably a spur toothing, i.e., preferably is not cut obliquely. The same applies to the second toothing which is formed, e.g., by an inner toothing.

In particular, the toothing 1 can be provided in a drive spindle for driving a roll, as shown in FIGS. 6 and 7, which is provided in rolling mills of various types. The construction of such drive spindles is generally known. The toothing 1 can be formed as one piece with a drive spindle or be mounted on the drive spindle.

The device for driving two rolls 13 of a rolling mill, which is shown in FIG. 6, has, for each of the rolls 13, an output shaft (not shown) of a motor or motor drives 14, wherein an intermediate shaft 15 is arranged between the rolls 13 and the output shafts 14, respectively.

The intermediate shaft 15 has, at each of its ends, the inventive toothing 16, 17, respectively. The toothing 17 engages in an inner toothing 19 of the roll 13 in spline-like manner, and the other toothing 16 engages in the inner toothing 18 of the output shaft 14. The intermediate shaft 15 is arranged at an angle relative to the roll 13 and relative to the output shaft 14. Thereby, a noticeably greater distance of the output shafts 14 or the motors and/or drives from each other becomes possible, which corresponds to the distance between axes of the rolls 13.

The inner toothing 18 of the shaft 14 is formed as spur toothings, whereby in accordance with the requirements, the inventive spur toothing can be used.

The inner toothing 18 enables displacement of the engaging toothings 16 of the intermediate shafts 15 in the axial direction by a maximum stroke, whereby per se known axial displacement of the rolls 13 during a rolling process is possible.

The above-mentioned features can be arbitrarily combined with each other. In addition, one of ordinary skill in the art can change constructive particularities to a different shape.

What is claimed is:

1. Spline spur toothing for force transmission from a drive shaft to a driven member arranged at angle to each other, comprising a first spur toothing (1) engaging in a second spur toothing provided on the driven member,
   wherein the first spur toothing (1) has a plurality of spur teeth (2), wherein a flank line (12) of each spur tooth (2) has a curvature, and a deflection angle ($\beta$) is formed between a rotational axis of the second spur toothing and a rotational axis of the first spur toothing, and
   wherein a flank of the spur tooth (2) is formed with a twist in form of a profile angle deviation ($\varphi$) in direction of the flank of the spur tooth (2) in a vertical plane.

2. Spline spur toothing according to claim 1, wherein flanks of the spur teeth (2) are formed with a spur tooth tip profile relief with respect to an involute form of respective spur teeth (2).

3. Spline spur toothing according to claim 1, wherein flanks of the spur teeth (2) are formed with a spur tooth root profile relief with respect to an involute form of respective spur teeth (2).

4. Spline spur toothing according to claim 1, wherein the first spur toothing is an involute spur toothing, and a profile line of at least one of a spur tooth flank on a spur tooth root (4) and a spur tooth tip (5) is relieved at least parabolically, with a profile difference between a theoretical flank of the involute spur toothing and the relieved flank increases at least by second power as a function of a roll-off path over the profile of the involute spur toothing.

5. Spline spur toothing according to claim 4, wherein the spur tooth root (4) is relieved on the root circle between 0.2% and 3% of the spur tooth thickness on the pitch circle, and/or the spur tooth tip (5) is relieved on the tip circle between 0.1% and 2% of the spur tooth thickness on the pitch circle.

6. Spline spur toothing according to claim 1, wherein an involute line is symmetrically curved as a path of a bottom between two spur teeth in a width direction.

7. Spline spur toothing according to claim 1, wherein a curvature of the flank line (12) is so formed that difference between a greatest thickness of each spur tooth (2) at a height of the pitch circle and a smallest thickness of each spur tooth (2) at the height of the pitch circle corresponds to a value between 3% and 20% of the greatest thickness of each spur tooth (2) at the height of the pitch circle.

8. Spline spur toothing according claim 1, wherein the maximal profile angle deviation ($\varphi$) is between 0.3° and 1.5°.

9. Spline spur toothing according to claim 1, wherein the twist of the spur teeth (2) is formed substantially parabolic in direction of the spur tooth flank.

10. Device for driving a roll in a rolling mill, comprising a shaft (15) with a first spur toothing (16, 17) engaging in a second spur toothing (18, 19) of a drive spindle for driving the roll (13), wherein each spur toothing has a plurality of spur teeth (2), wherein a flank line (12) of each spur tooth (2) of the first and second spur toothings (16, 17) has a curvature and a deflection angle ($\beta$) is formed between a rotational axis of the second spur toothing and a rotational axis of the first spur toothing, wherein, a flank of each spur tooth (2) of the first and second spur toothings is formed with a twist in form of a profile angle deviation ($\varphi$) in direction of the flank of the spur tooth (2) in a vertical plane, and wherein the first and second spur toothings (16, 17, 18, 19) are spline spur toothings.

11. Device according to claim 10, wherein
   the first spur toothing (16, 17) is provided at both ends of the shaft (15).

12. Device according to claim 10, wherein the shaft (15) and a roll (13) are arranged at a deflection angle ($\beta$) greater than 0.2° to each other.

13. Device according to claim 12, wherein the deflection angle ($\beta$) amounts to no more than 5°.

14. Device according to claim 13, wherein the deflection angle ($\beta$) is between 2° and 5°.

15. Device according to claim 10, wherein the profile angle deviation (y) changes over the half length of the spur tooth from zero to a maximum value at a tooth tip.

* * * * *